United States Patent
Roosen et al.

(10) Patent No.: US 11,193,911 B2
(45) Date of Patent: Dec. 7, 2021

(54) METHOD FOR DETERMINING THE MOISTURE CONTENT WITHIN A COOKING CHAMBER OF A COOKING DEVICE, AND COOKING DEVICE

(71) Applicant: RATIONAL Aktiengesellschaft, Landsberg am Lech (DE)

(72) Inventors: Petra Roosen, Aachen (DE); Thomas Schreiner, Landsberg am Lech (DE); Oliver Merker, Landsberg am Lech (DE)

(73) Assignee: RATIONAL AKTIENGESELLSCHAFT, Landsberg am Lech (DE)

( * ) Notice: Subject to any disclaimer, the term of this patent is extended or adjusted under 35 U.S.C. 154(b) by 279 days.

(21) Appl. No.: 16/316,960

(22) PCT Filed: Jul. 11, 2017

(86) PCT No.: PCT/EP2017/067408
§ 371 (c)(1),
(2) Date: Jan. 10, 2019

(87) PCT Pub. No.: WO2018/011210
PCT Pub. Date: Jan. 18, 2018

(65) Prior Publication Data
US 2021/0041396 A1 Feb. 11, 2021

(30) Foreign Application Priority Data
Jul. 11, 2016 (DE) .......................... 102016112683.7

(51) Int. Cl.
*G01N 29/024* (2006.01)
*G01N 29/036* (2006.01)
(Continued)

(52) U.S. Cl.
CPC .......... *G01N 29/024* (2013.01); *G01N 29/036* (2013.01); *G01N 29/326* (2013.01); *G01N 29/46* (2013.01)

(58) Field of Classification Search
CPC .... G01N 29/024; G01N 29/46; G01N 29/036; G01N 29/326
(Continued)

(56) References Cited

U.S. PATENT DOCUMENTS 4,208,906 A * 6/1980 Roberts, Jr. .......... G01N 29/024
73/152.32
5,689,060 A 11/1997 Matsushima
(Continued)

FOREIGN PATENT DOCUMENTS

DE 906023 C 4/1954
DE 1291916 B 4/1969
(Continued)

*Primary Examiner* — Tarun Sinha
(74) *Attorney, Agent, or Firm* — Hayes Soloway PC

(57) ABSTRACT

A method for determining the moisture within a cooking chamber of a cooking device has the following steps:
  a) an acoustic oscillation generating in a resonance chamber,
  b) a control unit receiving the signals picked up by a microphone in the resonance chamber,
  c) the control unit determining the frequency spectrum of the acoustic oscillations present in the resonance chamber on the basis of the received signals and determines the speed of sound within the cooking chamber on the basis of the frequency spectrum,
  d) the control unit receives receiving a temperature value; and
  e) the control unit determines the moisture within the cooking chamber by means of the temperature value and the speed of sound.

24 Claims, 5 Drawing Sheets

(51) Int. Cl.
*G01N 29/32* (2006.01)
*G01N 29/46* (2006.01)

(58) Field of Classification Search
USPC .......................................... 73/579, 597, 584
See application file for complete search history.

(56) References Cited

U.S. PATENT DOCUMENTS

2003/0188580 A1* 10/2003 Cardelius ............. G01N 29/024
73/579
2012/0225179 A1 9/2012 Argudayev et al.

FOREIGN PATENT DOCUMENTS

EP 1300079 A2 * 4/2003 ........... G01N 29/036
EP 1300079 A2 4/2003

* cited by examiner

METHOD FOR DETERMINING THE MOISTURE CONTENT WITHIN A COOKING CHAMBER OF A COOKING DEVICE, AND COOKING DEVICE

CROSS REFERENCE TO RELATED APPLICATIONS

This application is a U.S. National phase entry under 35 U.S.C. § 371 of International Application No. PCT/EP2017/067408, filed on Jul. 11, 2017, which claims priority to German Patent Application 102016112683.7, filed on Jul. 11, 2016. Each of these patent applications is incorporated by reference herein in its entirety.

The invention relates to a method for determining the moisture within a cooking chamber and a cooking device for this purpose.

Such cooking devices can be configured as so-called combi steamers, i.e. cooking devices in which the food to be cooked is cooked with hot air and/or steam. With such cooking devices, it is necessary to know the moisture in the cooking chamber, i.e. the water content of the atmosphere in the cooking chamber of the cooking device, in order to optimally prepare food.

Various methods are used to measure moisture, such as measuring a drop in pressure at the fan wheel of the cooking device. However, the results of such methods are also dependent on other external factors, such as air pressure, for example, which can cause measurement inaccuracies.

It is therefore the object of the invention to provide a cooking device and a method for determining the moisture within a cooking chamber of a cooking device, which can precisely determine the moisture within the cooking chamber by simple means.

The object is achieved by a method including the following steps:
 a) an acoustic oscillation is generated in a resonance chamber in the cooking device;
 b) a control unit receives the signals picked up by a microphone in the resonance chamber;
 c) the control unit determines the frequency spectrum of the acoustic oscillations present in the resonance chamber on the basis of the received signals and determines the speed of sound within the cooking chamber on the basis of the frequency spectrum;
 d) the control unit receives a temperature value;
 e) the control unit determines the moisture within the cooking chamber by means of the temperature value and the speed of sound.

The oscillations in the resonance chamber are generated by a broadband sound source. The oscillations in the resonance chamber are natural oscillations of the resonance chamber, i.e. standing waves of the fundamental order or higher orders in the resonance chamber, also referred to as fundamental oscillations or harmonics.

The moisture is determined by determining or indirectly measuring the speed of sound in the resonance chamber, the speed of sound in the resonance chamber being dependent on the temperature and composition of the atmosphere in the resonance chamber. To determine the speed of sound, the frequencies of the oscillations excited in the resonance chamber, in particular the frequency of the fundamental oscillation, are determined, from which the speed of sound can be inferred with the aid of the known wavelength of the fundamental oscillation.

Since the frequency spectrum of the oscillations present in the resonance chamber is determined for determining the speed of sound, the frequency of the fundamental oscillation can, for one thing, be determined very precisely because the frequencies of the harmonics determined can be made use of for correcting the frequency value of the fundamental oscillation determined. For another thing, the determination of the fundamental frequency and thus the determination of the moisture is independent of the drive of the sound source, and a complicated and in-phase coupling of the sound of the sound generator to the resonance chamber is dispensed with, since natural oscillations, i.e. resonances in the resonance chamber, are brought about for certain by the broadband excitation. In this way, the moisture can be precisely determined using simple means, some of which are already available in the cooking device.

Preferably, the temperature value corresponds to the temperature in the resonance chamber and/or the control unit can determine the temperature in the resonance chamber based on the temperature value. The temperature value is, for example, a measured value of a temperature sensor in the resonance chamber or in the cooking chamber. However, it is also conceivable that the temperature value is a different value from which the control unit can infer the temperature in the resonance chamber, for example the desired temperature of the heating device of the cooking device. In this way, the temperature in the resonance chamber can be determined very precisely.

For example, the control unit determines the frequency spectrum by means of a Fourier analysis and/or by determining the correlation function, which allows the frequency spectrum to be determined reliably.

The object is further achieved by a cooking device including a resonance chamber, a sound generator, a microphone associated with the resonance chamber, a temperature value unit which can generate a signal which is dependent on the temperature of the atmosphere in the cooking device, and a control unit to which the microphone and the temperature value unit are connected, the control unit containing a module for spectral analysis, in particular a Fourier analysis module and/or a correlation function module. The module for spectral analysis enables the control unit to precisely determine the frequency spectrum of the oscillations occurring in the resonance chamber.

Preferably, the cooking device includes a fan wheel, the fan wheel constituting the sound generator. This means that aside from the components already present in the cooking device, no further components are required in order to generate the necessary sound.

The cooking device may include a loudspeaker, the loudspeaker constituting the sound generator, so that the moisture can be determined also independently of the operation of the cooking device, in particular independently of the operation of the fan wheel.

In one configuration of the invention, the cooking device includes a loudspeaker controller adapted to drive the loudspeaker such that the loudspeaker emits noise or performs a frequency sweep. The noise may be white noise. In a frequency sweep, the loudspeaker generates an oscillation of a frequency, the frequency of this oscillation sweeping over a frequency range for a particular time interval. In this way, too, an ultimately broadband signal is generated.

Due to this type of drive, it is not necessary to adjust the signal of the loudspeaker in terms of amplitude and phase exactly to the resonance chamber, which is difficult in particular if the loudspeaker is provided spatially remote from the resonance chamber. Due to the broadband drive of the loudspeaker, this complex adaptation is dispensed with, so that the position of the loudspeaker can be selected independently of the position of the resonance chamber.

In one variant embodiment, the cooking chamber of the cooking device is the resonance chamber, which means that no further component is required in order to create the resonance chamber either.

In a further variant embodiment of the invention, the resonance chamber lies within a resonator which is open towards the cooking chamber of the cooking device. The resonator is constituted here by a geometrically clearly defined space that is comparatively small compared to the cooking chamber, for example in the form of a cylinder or a rectangular cavity. In this way, the dimensions and geometries of the resonance chamber can be freely selected.

For example, the resonator is arranged in the cooking chamber of the cooking device. In this way, the cooking chamber can be very well thermally and acoustically coupled to the resonator. The resonator can be open at its lower end and/or arranged in such a way that the resonator is also cleaned by the washing liquor of the cooking device when the cooking chamber of the cooking device is cleaned. The temperature sensor can also be arranged on the resonator.

The resonator is preferably configured as a tube, which makes the resonator easy and cost-effective to manufacture. For example, the tube is 20 cm long and/or has an inside diameter of 1.5 cm to 2 cm. Also, the tube may be open on one or both sides and/or is arranged vertically in the cooking chamber. It is also conceivable that at least one aperture is provided in the wall of the tube in order to influence the oscillations arising in the resonator.

In a further embodiment, the resonator includes a first tube and a second tube acoustically coupled to the first tube and/or a cavity acoustically coupled to the first tube. The tubes may preferably be of different lengths and/or have different diameters. The tubes may also be parallel to each other. Since several acoustically coupled volumes are created by the two tubes or by the first tube and the cavity, the frequency or resonance spectrum of the resonator is given a characteristic structure which offers a simple possibility of differentiation from acoustic sources of interference.

For example, the second tube and/or the cavity start from the first tube, which ensures a good acoustic coupling.

In one variant embodiment of the invention, the cooking device has a cavity which is acoustically coupled to the resonance chamber at a coupling site, the microphone being provided in the cavity. In this way, the microphone can be arranged outside the resonance chamber and the cooking chamber. The cavity may be formed by a further tube or a hose. The diameter of the hose or of the tube differs from the diameter of the resonator at the coupling site to produce an impedance jump at the coupling site, thereby reducing the coupling between the cavity and the resonator in order to couple less energy out of the resonator. Also, the length of the cavity can be selected such that the resonant frequency of the system made up of the resonance chamber and the cavity differs significantly from the resonant frequency of the resonance chamber, so that a clear distinction can be made in the frequency spectrum between the oscillations in the resonance chamber alone and any oscillations possibly occurring in the system made up of the cavity and the resonance chamber.

In the case of two separate tubes as resonators, the cavity may be directly coupled to both inner volumes of the tubes. Also, in this case it is conceivable that two cavities having one microphone each are provided, which are each coupled to one of the tubes.

Preferably, the cavity includes a diaphragm which is arranged in the coupling site to protect the microphone from water vapor, dirt and heat.

The diaphragm may have an embossing and/or may be shaped such that the installation, e.g. with a press fit, reduces or does not increase the restoring forces against deflection of the diaphragm. In addition, a step may be provided in the wall of the cavity to attach the diaphragm.

For a good coupling of the cavity to the resonance chamber, the diaphragm may have an embossing consisting of at least one concentric ring.

For example, at its end remote from the coupling site, the cavity may be shaped so as to be vibration damping or vibration absorbing, in particular taper towards the end, in particular taper to a point, so that vibrations in the cavity are damped and no standing waves can develop in the cavity.

The cavity may also be provided with sound-absorbing material, in particular at its end remote from the coupling site, so that vibrations in the cavity are not reflected.

In one variant embodiment, the cavity widens in a funnel-shaped manner towards the coupling site. This means that a thin diaphragm with a large surface area can be used and reflections at the coupling site can be avoided.

In a further configuration of the invention, the microphone is provided in the resonance chamber, whereby the amplitudes of the oscillations in the resonance chamber can be measured directly and accurately.

Preferably, the microphone or the coupling site is arranged in the region of the maximum of the sound pressure of one or more natural oscillations of the resonance chamber, whereby a good coupling of the microphone to the resonator is achieved, so that the quality of the measurement can be improved. Other positions of the microphone or the coupling site that exhibit a favorable coupling are also conceivable. One possible position of the microphone or the coupling site is the center of the tube with respect to its longitudinal axis. Preferably, the microphone or the coupling site is located at a distance of between 10% and 15%, in particular about 13%, of the length of the tube from the end of the tube in the longitudinal direction.

In one embodiment, the temperature value unit is provided at or in the resonator, in particular in the region of the coupling site, so that the temperature of the air oscillating in the resonator can be measured reliably. The temperature value unit may be a thermometer, for example a thermocouple.

Further features and advantages of the invention are apparent from the following description and from the accompanying drawings, to which reference is made and in which.

Figure 1:
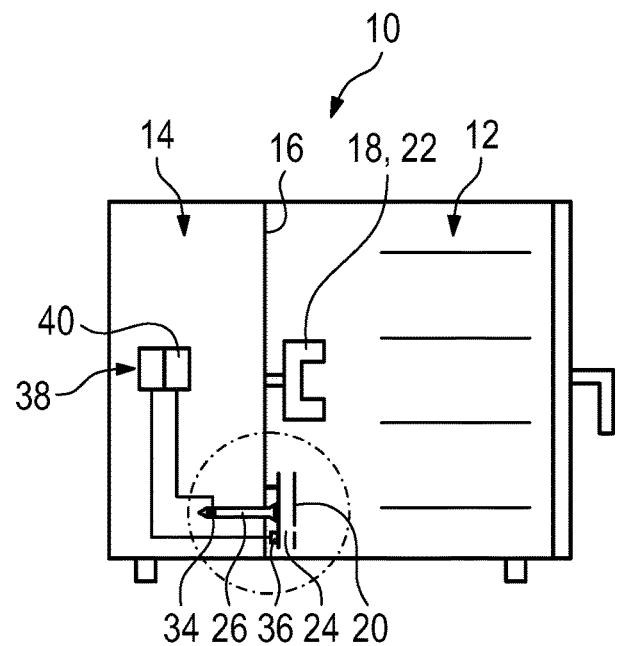
FIG. 1 shows a schematic section of a first embodiment of a cooking device according to the invention.

FIG. 1 shows a cooking device 10 intended for professional use in canteen kitchens and large-scale catering. It is, for example, a combi steamer that can prepare different dishes with hot air and/or superheated steam. For this purpose, an atmosphere is generated in the cooking chamber 12 which has the temperature and moisture desired for cooking. The temperature and moisture are checked by a cooking device controller that controls a heating device and an evaporator. For the sake of clarity, illustration of the cooking device controller, the heating device and the evaporator has been dispensed with.

The cooking chamber 12 and the technical equipment chamber 14 are separated from each other by a rear wall 16 of the cooking chamber 12.

A fan wheel 18 and a resonator 20 are arranged on the rear wall 16 on the cooking chamber side, the fan wheel 18 constituting a sound generator 22.

Figure 2:
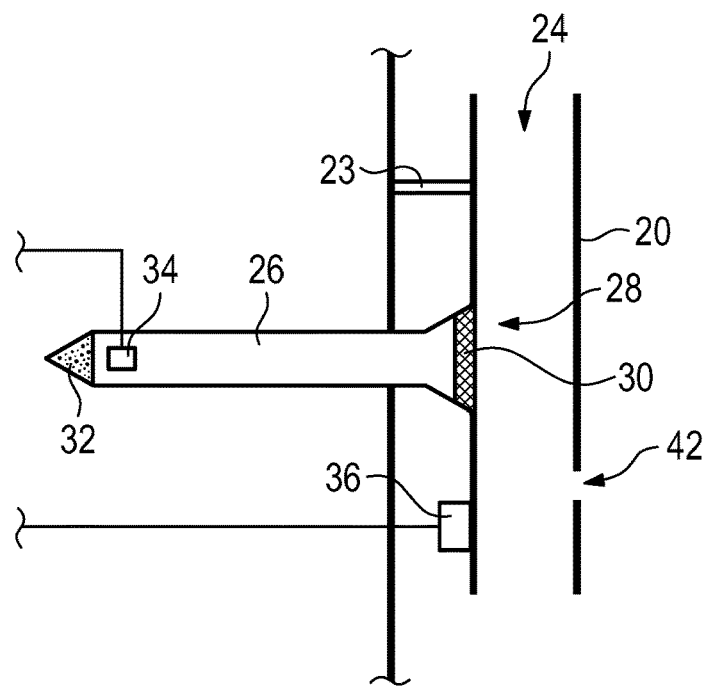
FIG. 2 shows an enlarged view of part of the cooking device according to FIG. 1.

The resonator 20 is fixed to the rear wall 16 by means of a fastener 23. The portion of the cooking device 10 around the resonator 20 is shown enlarged in FIG. 2.

The resonator 20 is configured as a tube and has, for example, a length L of 20 cm and an inside diameter of between 1.5 cm and 2 cm. Both ends of the tube are open, so that the resonator 20 is a resonator open on both sides. However, it is also conceivable that only one side of the resonator 20 is open.

The resonator 20 defines a resonance chamber 24 inside the tube. The resonance chamber 24 is thus located inside the cooking chamber 12 and is open towards the cooking chamber 12.

The tube and thus the resonator 20 are arranged vertically in the cooking chamber 12. Therefore, when the cooking device 10 is cleaned, the washing liquor penetrates also into the tube of the resonator 20 and thus cleans the resonator 20.

A cavity 26, which may be formed by a hose or a further tube, is provided at resonator 20.

The cavity 26 opens into the resonance chamber 24 of the resonator 20, with the site at which the cavity 26 merges into the resonance chamber 24 being referred to as coupling site 28.

At the coupling site 28 a thin diaphragm 30 is provided, which closes the cavity 26 from the resonance chamber 24, so that neither hot air nor water vapor nor dirt can enter the cavity 26.

At the same time, however, the diaphragm 30 can vibrate so that vibrations can be transferred from the resonance chamber 24 to the cavity 26. The cavity 26 and the resonance chamber 24 are therefore acoustically coupled.

The diaphragm 30 is between 10 μm and 50 μm thick, for example.

In the embodiment shown, the cavity 26, viewed in the longitudinal direction of the resonator 20, opens centrally into the resonance chamber 24. In other words, in the embodiment shown the coupling site 28 is located at half the length L/2 of the resonator 20.

The diameter of the cavity 26 at the coupling site 28 differs from the diameter of the resonance chamber 24. For example, the diameter of the cavity 26 is significantly smaller.

The cavity 26 extends in the other direction, i.e. starting from the resonator 20 through the rear wall 16 and into the technical equipment chamber 14.

At the end of the cavity 26 facing away from the resonator 20, the hose or tube defining the cavity 26 is tapered and closed. In this way, the cavity 26 is shaped to be vibration damping and vibration absorbing at its end remote from the coupling site 28.

Sound absorbing material 32 may also be provided in the cavity 26.

In the embodiment shown, a microphone 34 is provided in the portion of the cavity 26 which is located inside the technical equipment chamber 14.

In addition, a temperature value unit 36 in the form of a temperature sensor is provided at the resonator 20 in the embodiment shown.

Arranged in the technical equipment chamber 14 is a control unit 38 which is connected to the microphone 34 and the temperature value unit 36, i.e. the temperature sensor. The control unit 38 receives signals from both the microphone 34 and the temperature value unit 36.

The control unit 38 includes a module 40 that receives the signals of the microphone 34 and can perform a spectral analysis of the received signal by means of a Fourier analysis and/or a correlation function. In this way, the module 40 can determine the frequency spectrum (FIG. 3) of the signal of the microphone 34 and thus the frequency spectrum of the oscillations in the resonance chamber 24.

One or more apertures 42 in the wall of the resonator 20 or the tube of the resonator 20 can be used for exerting influence on which harmonics can form in the resonator 20.

To determine the moisture during operation of cooking device 10, sound is first generated in the cooking chamber 12 (S1). In the embodiment shown, this is done by the fan wheel 18, which generates a broadband noise during its operation, i.e. serves as a sound generator 22 with a broadband spectrum.

The sound generated by the sound generator 22 propagates to the resonator 20 and excites the natural oscillations of the resonance chamber 24 within the resonator 20, i.e. in the resonance chamber 24. As a result, standing acoustic waves develop in the resonance chamber 24. One or more harmonics can also be excited (S2) in the resonance chamber 24 in addition to the fundamental oscillation or the fundamental tone of the resonator 20.

It is also conceivable that only harmonics are excited if the frequency of the fundamental oscillation lies outside the range generated by the sound generator 22.

The fundamental oscillation of the resonator 20 has pressure nodes at the two openings of the tube of the resonator 20 and a pressure antinode at half the length L/2. This pressure antinode thus forms at the coupling site 28 and causes the vibrations to propagate through the diaphragm 30 into the cavity 26.

In the cavity 26, the acoustic vibrations are then picked up by the microphone 34 and transmitted as an electrical signal to the control unit 38, more precisely to the module 40 for spectral analysis (S3).

In order to prevent the formation of a standing wave within the cavity 26 as well, the cavity 26 is provided with the sound absorbing material 32 and tapers at its end facing away from the coupling site 28.

In addition, the diameter of the cavity 26 is selected to be smaller than that of the resonance chamber 24 or of the resonator 20, so that the coupling between the system made up of the cavity 26 and the resonance chamber 24 and the resonance chamber 24 alone is reduced. In case the coupling is too high and especially if the cavity 26 is too large, too much power would be drawn from the natural oscillation in the resonance chamber 24, which would damp this natural oscillation.

In addition, by suitably selecting the length of the cavity 26, the resonant frequency of the system made up of the cavity 26 and the resonance chamber 24 can be selected to be sufficiently far away from the resonant frequency of the resonance chamber 24 alone.

The module 40 for spectral analysis receives the signals picked up by the microphone 34 and determines the frequency spectrum of the signal and thus the frequency spectrum of the oscillations excited in the resonance chamber 24 by means of a Fourier analysis and/or correlation functions (S4).

Figure 3:
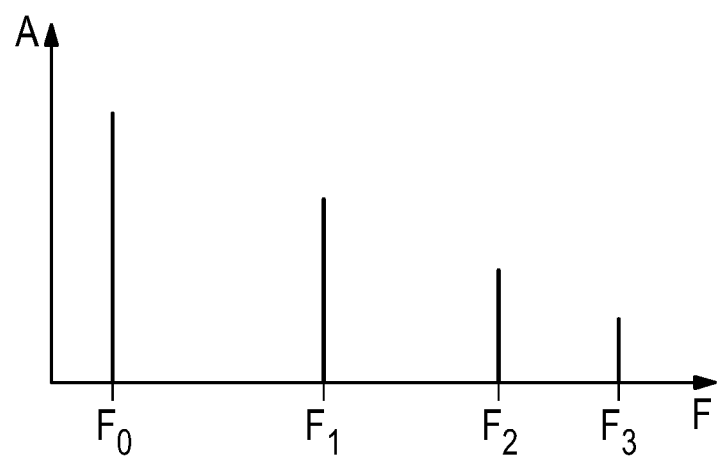
FIG. 3 shows an exemplary frequency spectrum determined by the control unit of the cooking device according to the invention as shown in FIG. 1.
Figure 4:
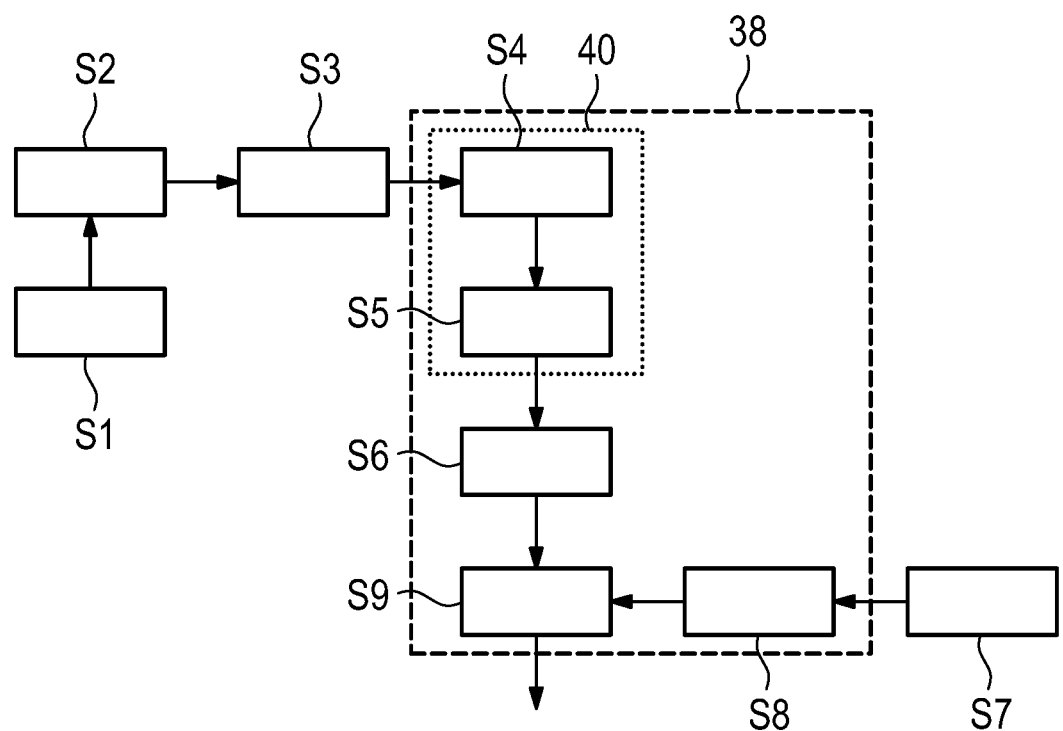
FIG. 4 shows a schematic flowchart of the method for determining the moisture.

Such a determined spectrum is illustrated in FIG. 3. Using the determined frequency spectrum, the module 40 determines the frequency $F_0$ of the fundamental oscillation or the fundamental tone of the natural oscillations of the resonance chamber 24 (S5).

In the case shown in FIG. 3, the frequency $F_0$ of the fundamental oscillation can easily be read from the frequency spectrum. If desired, the read value $F_0$ can be compared with the frequencies $F_1$, $F_2$, $F_3$ and corrected.

In the event that the fundamental oscillation was not excited in the resonance chamber 24 and is therefore not present in the frequency spectrum, the module 40 determines the frequency $F_0$ of the fundamental oscillation on the basis of the distances of the frequencies $F_1$, $F_2$, $F_3$ of the harmonics occurring in the frequency spectrum.

The fact that the entire spectrum of the oscillations generated in the resonance chamber 24 is determined continuously or at regular intervals makes it irrelevant how precisely the sound generator 22 is operated or driven. The sound generator 22 only has to generate a broadband signal that excites acoustic oscillations in the resonance chamber 24. It is not necessary to tune the phase of the generated sound or similar. The determination of the moisture and of the frequency spectrum is therefore done independently of the drive of the source of sound.

Based on the frequency $F_0$ determined by the module 40 for spectral analysis, the control unit 38 now determines the speed of sound within the resonance chamber 24 using the formula $c=\lambda_0 \cdot F_0$, where $\lambda_0$ is the wavelength of the fundamental oscillation. The wavelength of the fundamental oscillation $\lambda_0$ is known on the basis of the geometry of the resonance chamber 24 and is stored in the control unit 38. In the embodiment shown, the wavelength $\lambda_0$ corresponds to about twice the length 2L of the resonator 20 (S6).

In order to be able to determine the moisture within the cooking chamber, the control unit 38 needs the value of the temperature T in the resonance chamber 24.

To this end, a temperature value is first generated by the temperature value unit 36 in a step S7.

In the embodiment shown, the temperature value unit 36 is the temperature sensor at the resonator 20, so that the temperature value is generated by measuring the temperature of resonator 20.

However, it is also conceivable that the temperature value unit 36 generates the temperature value from data of the cooking device controller. For example, the temperature value unit 36 takes the desired temperature of the heating device from the cooking device controller.

The control unit 38 receives the temperature value in step S8 and adjusts the temperature value if required. This may be necessary if the resonator 20 is located outside the cooking chamber 12 but is in communication with it so that it is filled with the cooking chamber atmosphere, whereas the temperature sensor is provided inside the cooking chamber 12 so that the temperature T in the resonance chamber 24 is lower than the measured temperature in the cooking chamber 12. In this case, the control unit 38 can correct the value received from the temperature value unit 36. The control unit 38 also corrects the temperature value, if necessary, if the temperature value was generated by the temperature value unit 36 in another way, as described above, for example if the temperature value 36 is the desired temperature of the heating device.

In the embodiment shown, however, the temperature value corresponds directly to the temperature of the resonator 20 and thus to the temperature T of the resonance chamber 24 and can be used immediately.

Now the control unit 38, in step S9, determines the moisture in the cooking chamber 12 using the determined speed of sound c and the temperature T in the resonance chamber 24. The speed of sound c is dependent on the temperature T and the composition of the atmosphere within the resonance chamber 24. For ideal gases, the following applies:

$$c = \sqrt{\frac{(K_{atmo} \cdot R_{mol} \cdot T)}{M_{atmo}}}$$

where $R_{mol}$ is the universal gas constant, $K_{atmo}$ is the adiabatic exponent, and $M_{atmo}$ is the molar mass of the gas mixture of water vapor and air of the cooking chamber atmosphere.

$M_{atmo}$ and $K_{atmo}$ and their ratio can thus be determined since the speed of sound c, the universal gas constant $R_{mol}$ and the temperature T are known. This approximation also describes the real gases of water vapor and air relatively well. However, especially for water vapor, deviations from the behavior of ideal gases can be taken into account. Alternatively, an empirical relationship between the speed of sound and the gas composition can be used.

In this way, the composition of the atmosphere in the resonance chamber 24 can be determined, i.e. the proportion of water vapor to air in the atmosphere, which also determines the moisture in the atmosphere in the cooking chamber 12.

Of course, the two equations may also be inserted into each other and solved for the ratio of $M_{atmo}$ to $K_{atmo}$. Other types of calculation of this ratio are also conceivable.

The moisture value determined in this way can now be transferred from the control unit 38 to the cooking device controller of the cooking device 10.

In the following, further embodiments of the cooking device according to the invention are described, which essentially correspond to the first embodiment. Identical or functionally identical parts are provided with the same reference numerals, and only the differences will be discussed.

Figure 5:
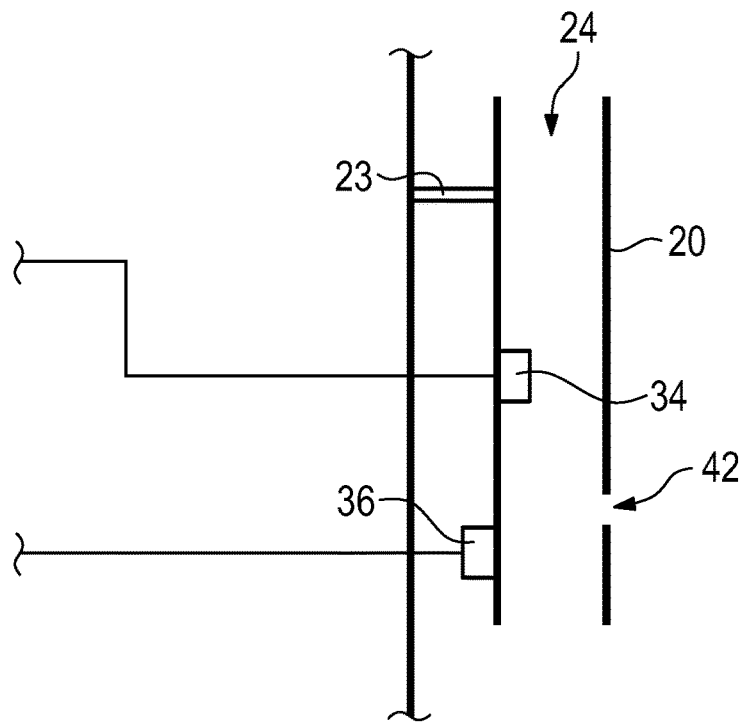
FIG. 5 shows an enlarged view of part of a second embodiment of a cooking device according to the invention.

FIG. 5 shows an enlarged illustration of part of a cooking device 10 according to the invention according to a second embodiment of the invention. The illustration of FIG. 5 corresponds to the illustration of FIG. 2 regarding the first embodiment.

In contrast to the first embodiment, no cavity 26 is provided, but the microphone 34 is arranged directly in the resonator 20, i.e. in the resonance chamber 24.

The microphone 34 may be arranged at the place at which the coupling site 28 was arranged in the first embodiment, i.e. in the longitudinal direction of the tube of the resonator 20 at about half the length L/2.

It is also conceivable that the microphone 34 or the coupling site 28 has a distance from the end of the tube that is between 10% and 15%, in particular about 13% of the length of the tube. This makes a particularly precise measurement possible, as the lower eigenmodes have more than half their maximum level there.

By arranging the microphone 34 in the resonance chamber 24, the temperature in the resonance chamber 24 can be measured directly. However, in this embodiment the microphone 34 is also exposed to the hot and sometimes greasy atmosphere in the cooking chamber, which significantly increases the requirements for the load capacity of the microphone 34.

Figure 6:
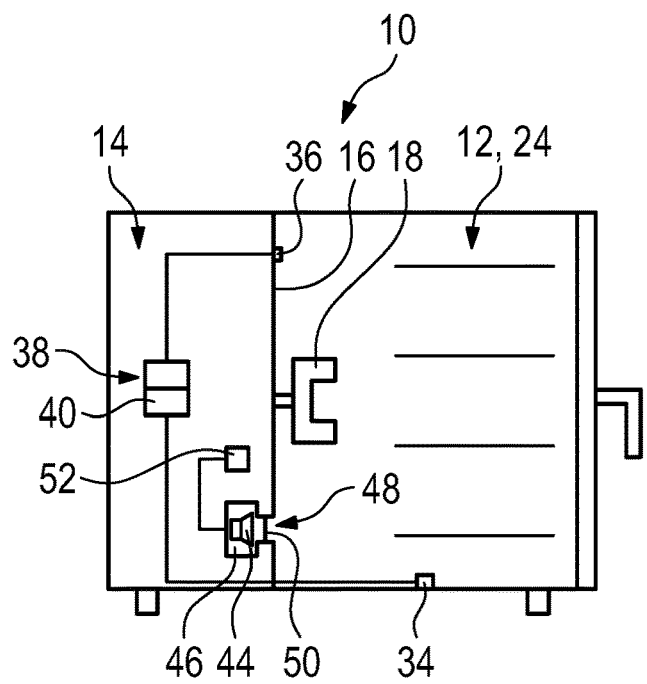
FIG. 6 shows a schematic section of a third embodiment of a cooking device according to the invention.

FIG. 6 shows a third embodiment of a cooking device 10 according to the invention.

In the third embodiment according to FIG. 6, no separate resonator 20 is provided, but the cooking chamber 12 itself serves as the resonance chamber 24.

The method for generating acoustic oscillations in the resonance chamber 24 also differs from that of the first embodiment.

In the embodiment shown in FIG. 6, the sound generator 22 is a loudspeaker 44.

The loudspeaker 44 is provided in a loudspeaker chamber 46, which is located inside the technical equipment chamber 14 and which is connected to the cooking chamber 12 by a line 48.

Provided in the line 48 is a further diaphragm 50, which allows an acoustic coupling between the cooking chamber 12 and the loudspeaker chamber 46, but at the same time protects the loudspeaker 44 from the atmosphere of the cooking chamber 12.

It is also conceivable, of course, that the loudspeaker 44 is arranged in the cooking chamber 12.

A loudspeaker controller 52 is electrically connected to the loudspeaker 44 and drives the loudspeaker 44.

In the embodiment shown, the microphone 34 is arranged in a central position at the bottom of the cooking chamber 12. It is of course also conceivable to mount the microphone 34 on a side wall or the ceiling of the cooking chamber 12.

The loudspeaker controller 52 controls the loudspeaker 44 such that the latter emits white noise, that is, a broadband sound signal.

Alternatively, the loudspeaker 44 can perform frequency sweeps by the drive of the loudspeaker controller 52. The loudspeaker 44 generates acoustic oscillations of one frequency each, i.e. pure tones, wherein the pitch, i.e. the frequency of these oscillations, repeatedly passes through a predetermined frequency band. Thus the output of the loudspeaker 44 is broadband in this case as well, since tones of different frequencies are generated.

Excited by the loudspeaker 44, standing waves now form in the cooking chamber 12, similar to the resonator 20 of the first embodiment, which correspond to the fundamental oscillation and/or harmonics of the resonance chamber 24.

In this embodiment, too, the oscillations are picked up by the microphone 34 and the determination of the frequency $F_0$ of the fundamental oscillation of the cooking chamber 12 and the determination of the moisture within the cooking chamber 12 are carried out in the same way as described for the first embodiment.

Figure 7:
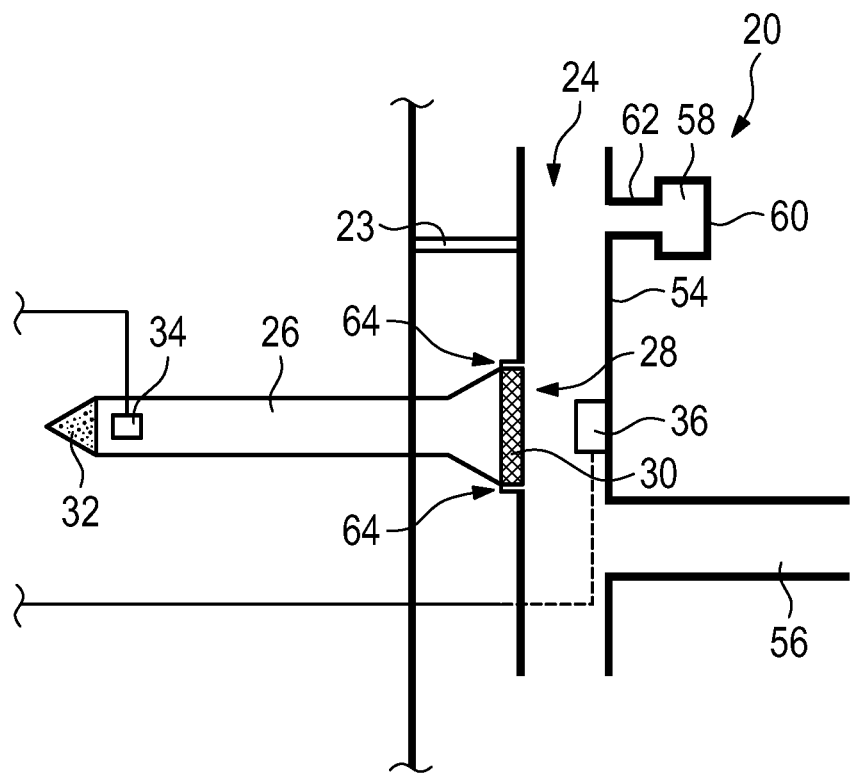
FIG. 7 shows an enlarged view of part of a fourth embodiment of a cooking device according to the invention.

FIG. 7 shows a fourth embodiment of a cooking device 10 according to the invention. The view of FIG. 7 is very similar to that of FIG. 2.

The resonator 20 of the fourth embodiment includes a first tube 54, which corresponds to the tube of the first embodiment, a second tube 56 and a cavity 58.

The first tube 54 has an internal volume that forms part of the resonance chamber 24.

The second tube 56 starts from the first tube 54 and is open at its end facing away from the first tube 54, i.e. it opens into the cooking chamber 12.

The inner volume of the second tube 56 is thus directly connected to the inner volume of the first tube 54 and also forms part of the resonance chamber 24.

The cavity 58 is a vessel having a closed inner volume, which is directly connected only to the inner volume of the first tube 54. The inner volume of the cavity 58 is thus also part of resonance chamber 24.

In the embodiment shown, the cavity 58 consists of a cuboid hollow body 60, which is connected to the first tube 54 via a connecting line 62. Such a design is also called a Helmholtz resonator.

Due to the fact that the resonance chamber 24 now has further volumes in addition to the inner volume of the first tube 54, the spectrum of resonant frequencies that can form in the resonance chamber 24 and thus in the resonator 20 changes. This results in a characteristic frequency spectrum for the resonator 20 (also called resonance spectrum) of the oscillations present in the resonator 20, which can be made use of for determining the speed of sound and thus the air moisture. Since the characteristic frequency spectrum consists of several frequencies, it is easier to distinguish from the frequencies of interference sources.

The individual frequencies of the frequency spectrum can be influenced by the dimensions of the second tube 56 and the cavity 58 and their coupling points to the first tube 54.

The locations shown in FIG. 7 are therefore only examples.

In addition, the temperature value unit 36 in this fourth embodiment is provided inside the resonator 20.

The temperature value unit 36 may be positioned in the region of the coupling site 28, e.g. opposite the mouth of the cavity 26.

In addition, in the fourth embodiment a step 64 is provided at the coupling site 28. The step 64 is flat and serves as a support surface for the diaphragm 30.

Figure 8:
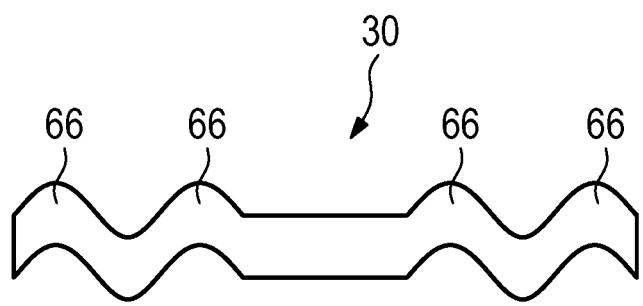
FIG. 8 shows a diaphragm of a cooking device according to FIG. 7 in section.

As shown in FIG. 8, the diaphragm 30 is embossed in this embodiment so that it is undulating in cross-section and two rings 66 concentric to each other and to the diaphragm 30 are formed.

These rings 66 absorb stresses in the diaphragm 30 that arise when the diaphragm 30 is installed in the cooking device 10. This allows the area within the innermost ring 66 to be kept free of tensions, so that its vibration characteristics, such as its restoring force, are not affected by the installation.

Figure 9:
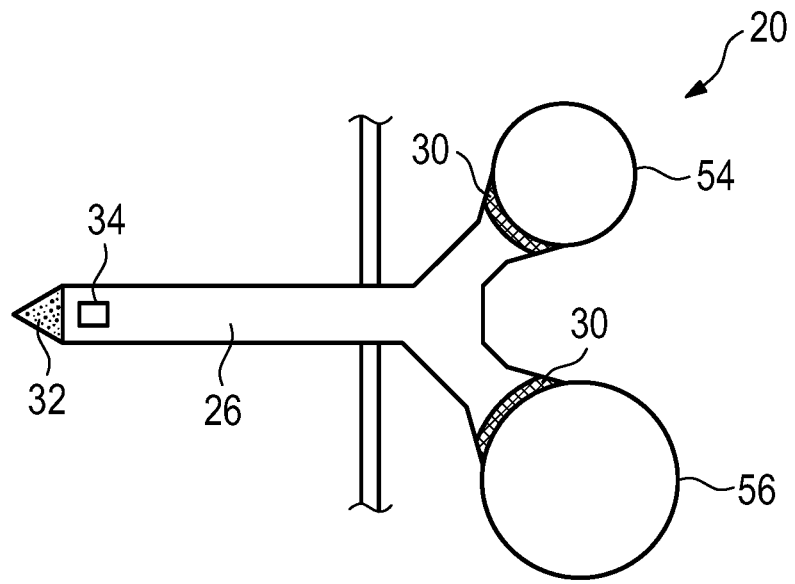
FIG. 9 shows an enlarged top view of part of a fifth embodiment of a cooking device according to the invention.

FIG. 9 shows a fifth embodiment of the invention. FIG. 9 shows a horizontal section through the cooking chamber wall, the cavity 26 and the resonator 20.

The resonator 20 includes a first tube 54 and a second tube 56 in this embodiment as well, the two tubes 54 and 56 now extending parallel. In addition, the two inner volumes of the tubes 54 and 56 have no direct fluidic contact. Nevertheless, the two tubes 54 and 56 form the resonator 20 due to their proximity to each other.

The tubes 54, 56 have different diameters and lengths. For example, the first tube 54 is shorter and has a smaller diameter than the second tube 56.

In this embodiment, the cavity 26 is connected to both tubes 54, 56, more precisely to both inner volumes of the tubes 54, 56. A respective coupling site 28 and a diaphragm 30 are provided for this purpose.

It is also conceivable that a separate temperature value unit 36 is provided in each of the tubes 54, 56.

The effect of the two tubes 54, 56 of the resonator 20 is the same as described for the fourth embodiment, since the second tube 56 adds further frequencies to the frequency spectrum of the resonator 20.

Figure 10:
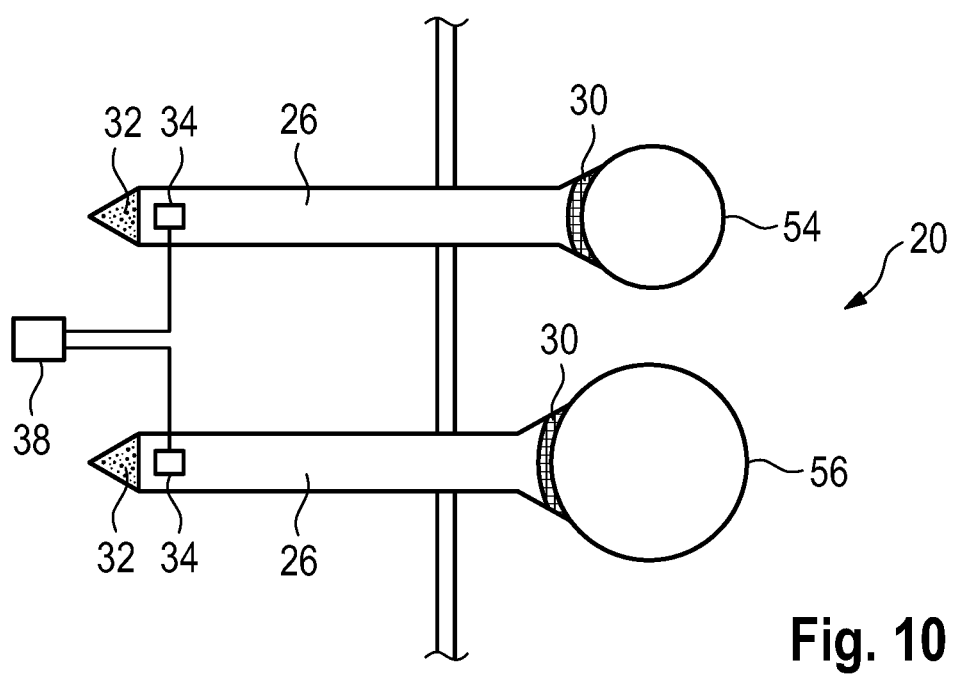
FIG. 10 shows an enlarged top view of part of a sixth embodiment of a cooking device according to the invention.

FIG. 10 shows a sixth embodiment of the invention. This essentially corresponds to the fifth embodiment, but in this sixth embodiment two cavities 26 are provided, each of which is connected to one of the tubes 54, 56 as described for the first embodiment.

The microphones 34 of the two cavities 26 are connected to the control unit 38.

It goes without saying that the features of the embodiments shown can be combined with each other in any desired way. In particular, it is conceivable that the embodiment shown in FIG. 1 can also be constructed without a separate resonator 20 and/or the cooking chamber 12 is also used as a resonance chamber 24.

In the first embodiment, a loudspeaker 44 can also serve as the sound generator 22.

It is also conceivable that the control unit 38 and/or the loudspeaker controller 52 are integrated in the cooking device controller.

The invention claimed is:

1. A method of determining the moisture within a cooking chamber of a cooking device, comprising the following steps:
 a) generating an acoustic oscillation in a resonance chamber in the cooking device;
 b) receiving a plurality of signals picked up by a microphone in the resonance chamber with a control unit;
 c) wherein the control unit determines a frequency spectrum of the acoustic oscillations present in the resonance chamber on the basis of the received signals and determines a speed of sound within the cooking chamber based on the frequency spectrum;
 d) receiving a temperature value with the control unit; and
 e) wherein the control unit determines the moisture within the cooking chamber using the temperature value and the speed of sound.

2. The method according to claim 1, wherein the temperature value further comprises either a sensed temperature in the resonance chamber or a value the control unit can use to determine the temperature in the resonance chamber.

3. The method according to claim 1, wherein the control unit determines the frequency spectrum using either a Fourier analysis or by determining a correlation function.

4. A cooking device comprising a resonance chamber, a sound generator, a microphone associated with the resonance chamber, a temperature value unit configured to generate a signal dependent on a temperature of an atmosphere in the resonance chamber, and a control unit to which the microphone and the temperature value unit are in communication, the control unit containing a module for spectral analysis comprising at least one of a Fourier analysis module or a correlation function module, wherein the control unit is configured to determine independently of the drive of the sound generator the moisture within the resonance chamber using the temperature value and the speed of sound.

5. The cooking device according to claim 4, wherein the sound generator further comprises a fan wheel.

6. The cooking device according to claim 4, wherein the sound generator further comprises a loudspeaker.

7. The cooking device according to claim 6, further comprising a loudspeaker controller adapted to control the loudspeaker, whereby the loudspeaker emits noise or performs a frequency sweep.

8. The cooking device according to claim 4, wherein the resonance chamber is a cooking chamber.

9. The cooking device according to claim 4, wherein the resonance chamber lies within a resonator which is open to a cooking chamber of the cooking device.

10. The cooking device according to claim 9, wherein the resonator is arranged in the cooking chamber.

11. The cooking device according to claim 9, wherein the resonator comprises a tube.

12. The cooking device according to claim 9, wherein the resonator includes a first tube; and a second tube acoustically coupled to the first tube.

13. The cooking device according to claim 12, further comprising a cavity acoustically coupled to the first tube, wherein the second tube and the cavity extend from the first tube.

14. The cooking device according to claim 4, further comprising a cavity acoustically coupled to the resonance chamber at a coupling site, wherein the microphone is located in the cavity.

15. The cooking device according to claim 14, wherein the cavity includes a diaphragm arranged in the coupling site.

16. The cooking device according to claim 15, wherein the diaphragm has an embossing comprising at least one concentric ring.

17. The cooking device according to claim 14, wherein the cavity shape dampens or absorbs vibration at an end remote from the coupling site, wherein the cavity shape comprises tapers starting from the coupling site and tapers to a point.

18. The cooking device according to claim 14, further comprising a sound-absorbing material provided at an end of the cavity remote from the coupling site.

19. The cooking device according to claim 14, wherein the cavity widens in a funnel-shape toward the coupling site.

20. The cooking device according to claim 4, wherein the microphone is in the resonance chamber.

21. The cooking device according to claim 4, wherein one of the microphone or the coupling site is arranged in the region of the maximum of the sound pressure of one or more natural oscillations of the resonance chamber.

22. The cooking device according to claim 4, wherein the temperature value unit is provided at or in the resonator in the region of the coupling site.

23. A cooking device comprising a resonance chamber, a sound generator, a microphone associated with the resonance chamber, a temperature value unit configured to generate a signal dependent on a temperature of an atmosphere in the resonance chamber, and a control unit to which the microphone and the temperature value unit are in communication, the control unit containing a module for spectral analysis comprising at least one of a Fourier analysis module or a correlation function module, wherein the cooking device further comprises a cavity acoustically coupled to the resonance chamber at a coupling site, wherein the microphone is located in the cavity.

24. A method of determining the moisture within a cooking chamber of a cooking device, comprising the following steps:
 a) generating an acoustic oscillation in a resonance chamber in the cooking device using a sound generator;

b) receiving a plurality of signals picked up by a microphone in the resonance chamber with a control unit;
c) wherein the control unit determines a frequency spectrum of the acoustic oscillations present in the resonance chamber on the basis of the received signals and determines a speed of sound within the cooking chamber based on the frequency spectrum;
d) receiving a temperature value with the control unit
e) wherein the control unit determines independently of the drive of the sound generator the moisture within the cooking chamber using the temperature value and the speed of sound.

\* \* \* \* \*